United States Patent
Jeong et al.

(10) Patent No.: US 10,484,906 B2
(45) Date of Patent: Nov. 19, 2019

(54) METHOD AND APPARATUS FOR APPLYING DIFFERENT PRIORITIES TO PACKETS

(71) Applicant: Samsung Electronics Co., Ltd., Gyeonggi-do (KR)

(72) Inventors: Sang Soo Jeong, Gyeonggi-do (KR); Song Yean Cho, Seoul (KR); Jung Je Son, Gyeonggi-do (KR); Han Na Lim, Seoul (KR); Sung Ho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/432,170

(22) PCT Filed: Sep. 27, 2013

(86) PCT No.: PCT/KR2013/008711
§ 371 (c)(1),
(2) Date: Mar. 27, 2015

(87) PCT Pub. No.: WO2014/051392
PCT Pub. Date: Apr. 3, 2014

(65) Prior Publication Data
US 2015/0289159 A1 Oct. 8, 2015

(30) Foreign Application Priority Data

Sep. 27, 2012 (KR) .................... 10-2012-0108047
Jan. 22, 2013 (KR) .................... 10-2013-0007057

(51) Int. Cl.
*H04W 28/02* (2009.01)
*H04L 12/26* (2006.01)
(Continued)

(52) U.S. Cl.
CPC ......... *H04W 28/0268* (2013.01); *H04L 43/00* (2013.01); *H04L 47/2441* (2013.01);
(Continued)

(58) Field of Classification Search
CPC ................................................ H04W 28/0268
See application file for complete search history.

(56) References Cited

U.S. PATENT DOCUMENTS 8,612,612 B1 * 12/2013 Dukes .................... H04L 67/14
370/230
2003/0231594 A1 * 12/2003 Xu ........................ H04L 1/1877
370/236
(Continued)

FOREIGN PATENT DOCUMENTS

| CN | 1669344 A | 9/2005 |
| CN | 1788501 A | 6/2006 |

(Continued)

OTHER PUBLICATIONS

Vodafone, Proposed CR on TS 23.060 for SIRIG, C4-120785, 3GPP TSG CT WG4 Meeting #56bis, Taipei, Taiwan, Apr. 16-20, 2012, pp. 1-11.*
(Continued)

*Primary Examiner* — Jason E Mattis

(57) ABSTRACT

Provided are a method and apparatus for processing packets. A method for processing packets in a base station (ENB) may include: obtaining information on a rule for dealing with a packet according to supplementary information contained in the header of the packet; receiving a packet; extracting supplementary information from the header of the received packet; and processing the received packet on the basis of the obtained rule information and extracted supple- (Continued)

mentary information. Hence, the base station may adequately perform packet control operations in accordance with the state thereof.

24 Claims, 18 Drawing Sheets

(51) Int. Cl.
  H04W 72/12      (2009.01)
  H04L 12/851     (2013.01)
  H04L 12/833     (2013.01)
(52) U.S. Cl.
  CPC ......... *H04L 47/31* (2013.01); *H04W 28/0205* (2013.01); *H04W 72/1247* (2013.01)

(56) References Cited

U.S. PATENT DOCUMENTS

| | | | |
|---|---|---|---|
| 2007/0097926 A1* | 5/2007 | Liu | H04L 47/10 370/335 |
| 2007/0165630 A1 | 7/2007 | Rasanen et al. | |
| 2008/0123660 A1* | 5/2008 | Sammour | H04L 47/10 370/395.21 |
| 2009/0011697 A1* | 1/2009 | Tobita | H04W 4/02 455/3.01 |
| 2009/0219937 A1* | 9/2009 | Liu | H04L 45/302 370/392 |
| 2010/0067400 A1* | 3/2010 | Dolganow | H04W 72/1236 370/253 |
| 2010/0142373 A1* | 6/2010 | Jin | H04L 12/14 370/230 |
| 2010/0246509 A1* | 9/2010 | Chen | H04W 60/00 370/329 |
| 2011/0019644 A1* | 1/2011 | Cheon | H04W 36/0033 370/331 |
| 2012/0008501 A1* | 1/2012 | Lundh | H04L 12/5695 370/235 |
| 2012/0218892 A1* | 8/2012 | Kotecha | H04L 47/14 370/235 |
| 2012/0224564 A1* | 9/2012 | Paisal | H04N 7/148 370/331 |
| 2012/0281685 A1* | 11/2012 | Kotecha | H04W 76/04 370/338 |
| 2012/0327779 A1* | 12/2012 | Gell | H04L 47/6275 370/238 |
| 2016/0270104 A1* | 9/2016 | Zhu | H04W 72/0413 |

FOREIGN PATENT DOCUMENTS

| | | |
|---|---|---|
| KR | 10-2011-0078308 | 7/2011 |
| KR | 10-2011-0094132 | 8/2011 |
| KR | 10-2012-0095897 | 8/2012 |

OTHER PUBLICATIONS

International Search Report dated Jan. 7, 2014 in connection with International Patent Application No. PCT/KR2013/008711, 3 pages.
Written Opinion of International Searching Authority dated Jan. 7, 2014 in connection with International Patent Application No. PCT/KR2013/008711, 7 pages.
Communication dated Jun. 6, 2016 in connection with European Patent Application No. 13 842 118.5.
Foreign Communication From a Related Counterpart Application, Chinese Application No. 201380050777.2, Text of the First Office Action dated Jan. 4, 2017, 19 pages.

* cited by examiner

RELATED ART

FIG. 5

| ELEMENT 1 | ELEMENT 2 | ... | ELEMENT N |

FIG. 6
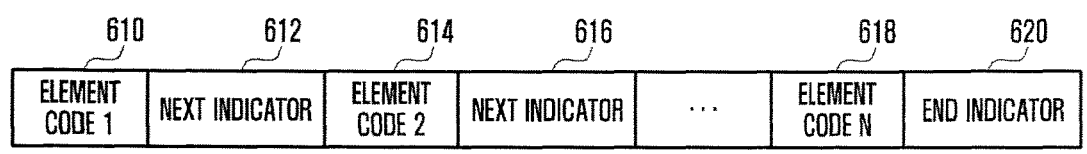
(a)
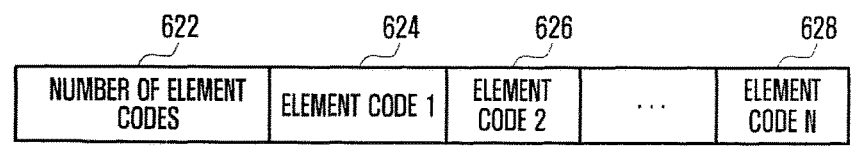
(b)

METHOD AND APPARATUS FOR APPLYING DIFFERENT PRIORITIES TO PACKETS

CROSS-REFERENCE TO RELATED APPLICATION(S)

The present application claims priority under 35 U.S.C. § 365 to International Patent Application No. PCT/KR2013/008711 filed Sep. 27, 2013, entitled "METHOD AND APPARATUS FOR PROCESSING PACKET", and, through International Patent Application No. PCT/KR2013/008711, to Korean Patent Application No. 10-2012-0108047 filed Sep. 27, 2012, and Korean Application No. 10-2013-0007057 filed Jan. 22, 2013, each of which are incorporated herein by reference into the present disclosure as if fully set forth herein.

TECHNICAL FIELD

The present invention relates to a method and apparatus for processing packets and, more particularly, to a method and apparatus that process packets appropriately so as to prevent congestion.

BACKGROUND ART

FIG. 1 illustrates an architecture of the existing Long Term Evolution (LTE) mobile communication system.

Referring to FIG. 1, the radio access network of the LTE mobile communication system is composed of a user equipment (UE) 100, an evolved base station (Evolved Node B, RAN node, eNB or Node B) 105, Mobility Management Entity (MME) 110, Serving Gateway (S-GW) 125, Packet Data Network Gateway (PDN-Gateway, P-GW) 130, Application Function (AF) 140, and Policy and Charging Rules Function (PCRF) 135. The UE 100 may connect to an external network through the ENB 105, S-GW 125 and PDN Gateway (P-GW) 130. The radio access network may further include or be connected with entities/systems such as Universal Terrestrial Radio Access Network (UTRAN) 180, GSM EDGE Radio Access Network (GERAN) 190, Serving GPRS Support Node (SGSN) 115, and Home Subscriber Server (HSS) 120.

The UE 100 may connect to an external network such as operator IP service 150 through the ENB 105, S-GW 125 and P-GW 130. The AF 140 is an entity that exchanges application related information with the user at an application level. The PCRF 135 is an entity for controlling policies related to user QoS (Quality of Service). Policy and charging control (PCC) rules corresponding to a specific policy are sent to the P-GW 130 for enforcement.

The ENB 105 is a radio access network (RAN) node, which corresponds to Radio Network Controller (RNC) of the UTRAN 180 or Base Station Controller (BSC) of the GERAN 190. The ENB 105 is connected with the UE 100 through a wireless channel and functions similarly to the existing RNC or BSC.

In the LTE system, as all user traffic including real-time services like VoIP (Voice over IP) services is served by shared channels, it is necessary to perform scheduling on the basis of status information collected from UEs 100. The ENB 105 performs this scheduling function.

The S-GW 125 provides data bearers, and creates and removes a data bearer under control of the MME 110. The MME 110 performs various control functions, and may be connected to multiple ENBs 105.

The PCRF 135 is an entity performing overall QoS and charging control functions for traffic.

In general, User Plane (UP) refers to a path involving the UE 100, ENB 105, S-GW 125 and P-GW 130, along which user data is sent and received. In this path, wireless channels with severe resource constraints are used between the UE 100 and ENB 105.

In a wireless communication system like LTE, QoS is applied on an Evolved Packet System (EPS) bearer basis. One EPS bearer is used to transmit IP flows having the same QoS requirements. QoS parameters such as QoS Class Identifier (QCI) and Allocation and Retention Priority (ARP) may be assigned to an EPS bearer. EPS bearers correspond to Packet Data Protocol (PDP) contexts of the General Packet Radio Service (GPRS) system.

The RAN has to exchange data with users within limited frequencies. When many users remain in a cell managed by a RAN node (i.e. ENB 105) or the amount of user traffic becomes large, congestion may arise in the RAN. In a related art scheme for dealing with congestion, the ENB 105 may prioritize resource allocation using QoS parameters such as QCI or ARP values assigned to bearers.

However, with introduction of various types of service applications, multiple media or IP flows with different QoS requirements may be involved in a single service or application. For example, when different media such as text, photograph, video and music coexist with each other in a single webpage, the individual media may have different QoS requirements in the existing system. In the case of failure in integrated congestion control, one medium may be delivered earlier or later than another medium, degrading service quality perceived by the user. For example, video mapped with a bearer of high-precedence QCI may be received first, and text mapped with a bearer of low-precedence QCI may be received later, causing user inconvenience.

DISCLOSURE OF INVENTION

Technical Problem

The present invention has been made in view of the above problems. Accordingly, an aspect of the present invention is to provide a packet processing method and apparatus that can effectively control packets in a congested situation.

Solution to Problem

In accordance with an aspect of the present invention, a method for processing packets is provided. The method may include: receiving a rule for packet inspection (PI) from Policy and Charging Rules Function (PCRF); analyzing information contained in a received packet; and determining whether to mark the packet with a service class identifier or index on the basis of the analyzed information and received rule.

In accordance with another aspect of the present invention, an apparatus for processing packets is provided. The apparatus may include: a communication unit to receive a rule for packet inspection (PI) from Policy and Charging Rules Function (PCRF); and a control unit to perform a process of analyzing information contained in a received packet, and determining whether to mark the packet with a service class identifier or index on the basis of the analyzed information and received rule.

In accordance with another aspect of the present invention, a method for transmitting a rule to a network entity constituting a mobile communication system is provided. The method may include: sending a service control (SC) rule to the network entity, wherein the SC rule is composed of at least one of rule ID identifying the rule, target criteria indicating targets to which the rule is applicable, service class identifier (SCI) format, SCI filter descriptor, filter application condition, base station operation to be performed on a packet matching the filter application condition, rule start condition, and rule end condition; and receiving a response corresponding to the sent SC rule from the network entity.

In accordance with another aspect of the present invention, a method for processing packets in a base station (ENB) is provided. The method may include: obtaining information on a rule for dealing with a packet according to supplementary information contained in the header of the packet; receiving a packet; extracting supplementary information from the header of the received packet; and processing the received packet on the basis of the obtained rule information and extracted supplementary information.

In accordance with another aspect of the present invention, a base station (ENB) for processing packets is provided. The base station may include: a communication unit to receive a packet; and a control unit to perform a process of obtaining information on a rule for packet handling according to supplementary information contained in the packet header, extracting supplementary information from the header of a received packet, and processing the received packet on the basis of the obtained rule information and extracted supplementary information.

In accordance with another aspect of the present invention, a method for processing packets is provided. The method may include: obtaining information on a rule composed of a condition and associated marking value; receiving a packet; marking a marking value on the header of the received packet according to the rule information; and sending the packet marked with the marking value.

In accordance with another aspect of the present invention, an apparatus for processing packets is provided. The apparatus may include: a communication unit to receive a packet; and a control unit to perform a process of obtaining information on a rule composed of a condition and associated marking value; and marking a marking value on the header of the received packet according to the rule information. The communication unit may send the packet marked with the marking value.

Advantageous Effects of Invention

In a feature of the present invention, it is possible to effectively control packets in a congested situation. Hence, service quality perceived by the user can be increased.

BRIEF DESCRIPTION OF DRAWINGS

FIG. 5 illustrates a SCI format according to an embodiment of the present invention.

FIG. 6 illustrates a format of the SCI format message according to an embodiment of the present invention.

MODE FOR THE INVENTION

In the following description of embodiments of the present invention, detailed descriptions of well-known functions and structures incorporated herein may be omitted to avoid obscuring the subject matter of the present invention.

The following description of embodiments of the present invention is focused on Third Generation Partnership Project (3GPP) LTE systems. However, it should be apparent to those skilled in the art that the subject matter of the present invention is also applicable to other communication/computer systems having a similar technical basis and system configuration without significant modification. For example, the description related to the LTE system may be applied to the UTRAN 180 and GERAN 190 having similar system architecture. In this case, the ENB (RAN node) may be replaced with the RNC/BSC, the S-GW 125 may be omitted or be included in the SGSN 115, and the P-GW 130 may correspond to the Gateway GPRS Support Node (GGSN). Bearers in the LTE system may correspond to PDP contexts in the UTRAN/GERAN system.

Figure 1:
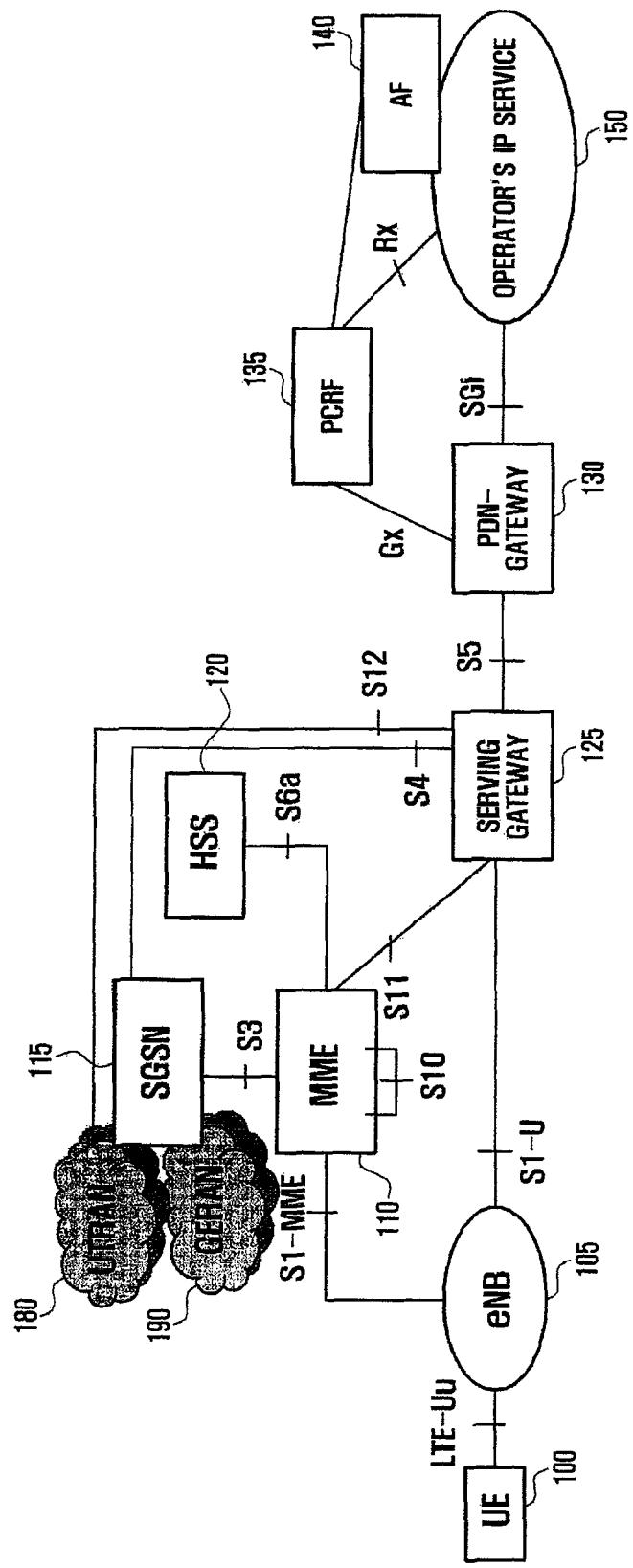
FIG. 1 illustrates an architecture of the existing Long Term Evolution (LTE) mobile communication system.
Figure 2:
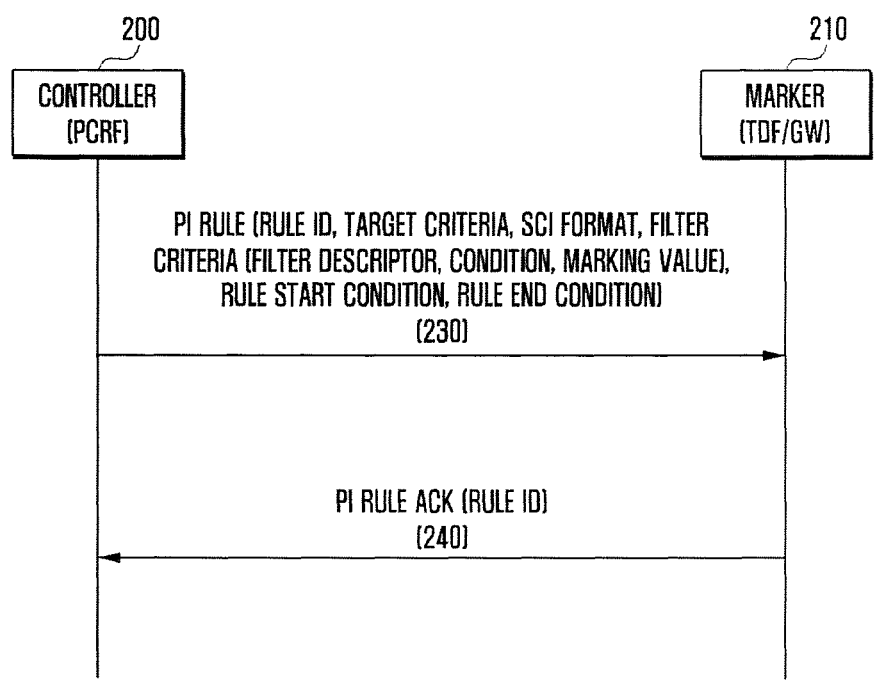
FIG. 2 is a sequence diagram of a procedure for transmitting a PI rule message according to an embodiment of the present invention.

FIG. 2 is a sequence diagram of a procedure for transmitting a PI rule message according to an embodiment of the present invention.

Referring to FIG. 2, the communication network includes a controller 200 and a marker 210. For example, the controller 200 may include the PCRF. The marker 210 may include a Traffic Detection Function (TDF) and/or a gateway. Here, the gateway may be at least one of the P-GW and the S-GW.

In one embodiment, the controller 200 controls the marker 210 to mark a user data packet with a service class. That is, the controller 200 provides the marker 210 with control information regarding the level of Packet Inspection (PI), the format and content of a service class identifier, the type of traffic to be identified, and start and end times for packet inspection. This contributes to more accurate and effective service class marking.

At step 230, the controller 200 sends one or more packet inspection (PI) rules to the marker 210. One PI rule may include a rule ID, target criteria, Service Class Identifier (SCI) format, one or more PI filter criteria, rule start condition, and rule end condition.

The target criteria may be given by Public Land Mobile Network (PLMN) ID, user or group ID, Access Point Name (APN), bearer type (Guaranteed Bit Rate (GBR) or non-GBR), QoS Class Identifier (QCI), or a combination thereof.

The SCI format indicates the format of supplementary information to be inserted in the packet header. The SCI format is described later with reference to FIG. 5.

The PI filter criterion may include a filter descriptor of a filter used for inspection, an application condition for the filter, and a marking value to be marked upon satisfaction of the condition. Here, the application condition may include an indication to the state or level of congestion of the ENB to which the UE (packet sender or receiver) belongs. The marking value is the SCI or a portion thereof that is to be written to the inspected packet when the packet is determined as belonging to a specific service or application. The filter descriptor indicates the scheme and/or level of inspection when the application condition is satisfied.

The rule start condition is a condition used to determine validity of the PI rule, and may include time information. The rule end condition is a condition used to determine invalidity of the PI rule, and may include time information.

The PI rule may be transmitted between the controller 200 and the marker 210 without relation to an IP Connectivity Access Network (IP-CAN) session. The PI rule may also be transmitted with relation to an IP-CAN session. When a PI rule is delivered without relation to an IP-CAN session, the PI rule is applicable to all packets. When a PI rule is delivered with relation to an IP-CAN session, the PI rule is applicable only to bearers belonging to the IP-CAN session.

Upon successful reception of the PI rule, at step 240, the marker 210 sends a PI rule ACK to the controller 200. The PI rule ACK contains the rule ID of the PI rule received at step 230. Hence, the controller 200 may be aware that the PI rule is successfully received by the marker 210. The PI rule at step 230 and the PI rule ACK at step 240 are in correspondence.

Figure 3:
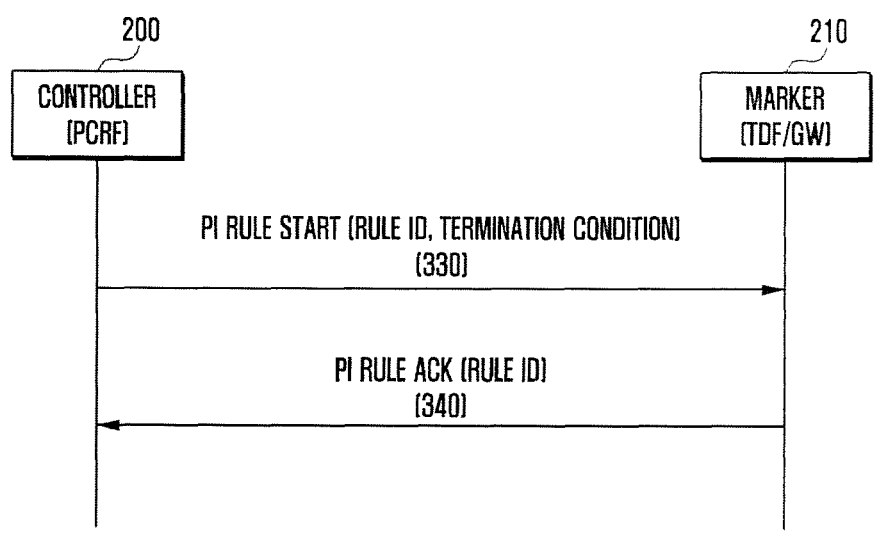
FIG. 3 is a sequence diagram of a procedure for transmitting a PI rule start message according to an embodiment of the present invention.

FIG. 3 is a sequence diagram of a procedure for transmitting a PI rule start message according to an embodiment of the present invention.

Referring to FIG. 3, at step 230, the controller 200 sends a PI rule start message indicating PI rule application to the marker 210. Here, the PI rule start message may contain the rule ID of a PI rule to be applied and a termination condition for terminating application of the PI rule. Upon reception of a PI rule start message, the marker 210 starts to apply the corresponding PI rule, which is treated as valid until the termination condition is satisfied.

Upon successful reception of the PI rule start message, at step 340, the marker 210 sends a PI rule ACK indicating successful reception to the controller 200. The PI rule ACK contains the rule ID of the PI rule start message received at step 330. Hence, the controller 200 may be aware that the PI rule start message is successfully received by the marker 210.

Figure 4:
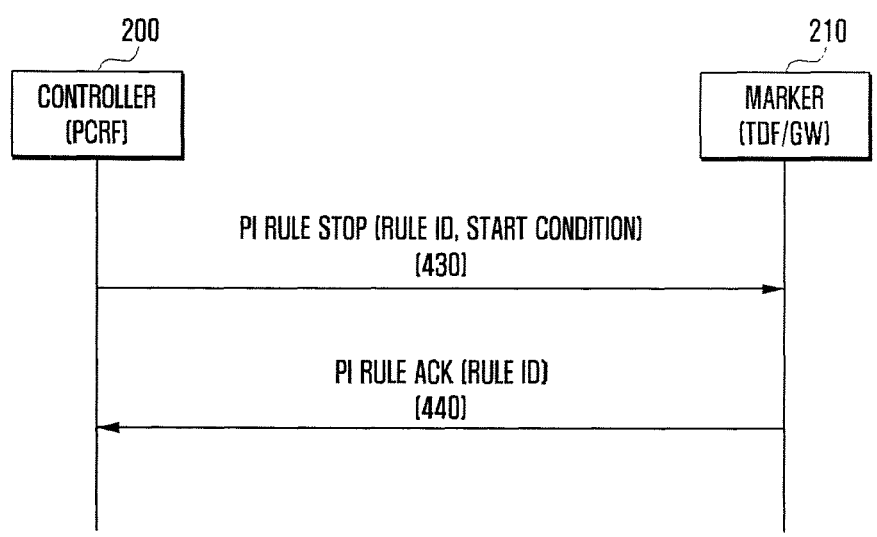
FIG. 4 is a sequence diagram of a procedure for transmitting a PI rule stop message according to an embodiment of the present invention.

FIG. 4 is a sequence diagram of a procedure for transmitting a PI rule stop message according to an embodiment of the present invention.

Referring to FIG. 4, at step 430, the controller 200 sends a PI rule stop message indicating PI rule termination to the marker 210. Here, the PI rule stop message may contain the rule ID of a PI rule to be stopped and a start condition for starting application of the PI rule. Upon reception of a PI rule stop message, the marker 210 stops application of the corresponding PI rule, which is treated as invalid until the start condition is satisfied.

Upon successful reception of the PI rule stop message, at step 440, the marker 210 sends a PI rule ACK indicating successful reception to the controller 200. The PI rule ACK contains the rule ID of the PI rule stop message received at step 430. Hence, the controller 200 may be aware that the PI rule stop message is successfully received by the marker 210.

In FIGS. 2 to 4, a PI rule ACK message is utilized. To enable the controller 200 to readily identify the message corresponding to the ACK message, the marker 210 may send the PI rule ACK message containing message identification information to the controller 200. Here, the message identification information may indicate one of a PI rule message, PI rule start message, and PI rule stop message. Alternatively, the controller 200 may send a message having a sequence number. Upon reception of the message, the marker 210 may respond with an ACK message containing the sequence number.

Figure 5:
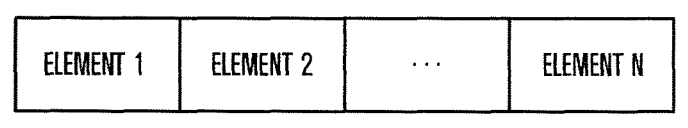

FIG. 5 illustrates a SCI format according to an embodiment of the present invention.

Referring to FIG. 5, a Service Class Identifier (SCI) may be used by the controller, marker and ENB. The SCI includes multiple elements indicating different pieces of information. Elements of the SCI may correspond to the following pieces of information.

PLMN to which the marker belongs

Indication to roaming of packet user (e.g. roaming=0, no-roaming=1)

Index to packet service (e.g. youtube=1, facebook=2, amazon=3,

Index to class of packet service (e.g. VoIP=1, streaming video=2, web browsing=3, Indication to whether packet service belongs to operator network (e.g. operator network service=0, third party service=1)

Index to packet content types (e.g. text=1, video=2, audio=3,

User or traffic priority determined by marker (e.g. high, medium, low)

The SCI exchanged within the network is composed of at least one of the above elements. For example, as shown in FIG. 5, the SCI may be composed of N elements, whose lengths may differ from each other.

FIG. 6 illustrates a format of the SCI format message according to an embodiment of the present invention.

Referring to FIG. 6, the controller and the marker have to exchange and share information on the SCI format. As pieces of information needed to deal with user packets may differ from network operator to network operator, it is necessary for the controller and the marker to share SCI format information. For example, in the case of a first network operator wishing to apply traffic control based on user roaming, the marker may insert a roaming indication in a user packet as a part of the SCI, and then the ENB (RAN node) may perform traffic control by use of the roaming indication. However, when a second network operator does not apply traffic control based on user roaming, a roaming indication inserted in the SCI information may be unnecessary information that simply causes an increase in the amount of control information. Hence, it is necessary to define the SCI format in such a manner that network operators can represent necessary information only as a SCI according to their policies and network entities can utilize such information. Network entities may utilize two representation schemes shown in parts (a) and (b) of FIG. 6 or any combination or variation thereof.

In part (a) of FIG. 6, SCI format information is represented using next and end indicators. Element codes are preset identifiers or indexes corresponding to elements constituting an SCI. A next indicator indicates presence of the next element code. The end indicator indicates the end of SCI information (absence of the next element code). For example, assume that a network entity has received an SCI format message as shown in part (a) of FIG. 6. Then, to analyze the SCI format message, the network entity may obtain a first element code 610 and examine presence of an indicator after the first element code 610. As a next indicator 612 is present after the first element code 610, the network entity may be aware that another element code is present and thus obtains a second element code 614 after the next indicator 612. The network entity may continue this process until the N-th element code 618 is obtained. As the indicator after the N-th element code 618 is an end indicator 620, the network entity may be aware that all the elements of the SCI format message are obtained and terminate message analysis.

The next and end indicators for an SCI format message may be represented using a 1-bit field. For example, the end indicator may be represented by '1' and a next indicator may be represented by '0'. This scheme is only an example. Any scheme that can indicate the end of SCI format information may be utilized in the present invention. Element codes are fields with a fixed size as will be described later.

In part (b) of FIG. 6, the number of element codes constituting an SCI is placed at the length field 622, and element codes 624, 626 and 628 are placed in sequence thereafter. For example, when the SCI format message includes N element codes including first to N-th element codes 624, 626, . . . , 628, the length field 626 is set to N. When a network entity receives an SCI format message as shown in part (b) of FIG. 6, it may identify the value of the length field 622 first and obtain multiple element codes whose number is given by the identified value.

Nodes using SCIs such as the controller, marker and ENB have to maintain a table or other data structure containing information on mappings between elements and element codes. Such a table is referred to as an element code mapping table. The element code mapping table may contain information regarding elements, element codes, lengths of elements, and element descriptions.

Table 1 illustrates an element code mapping table according to an embodiment of the present invention.

TABLE 1

| Element Code | Element Length | Description |
| --- | --- | --- |
| C_1 | N_1 | PLMN ID of marker |
| C_2 | N_2 | indication to user roaming |
| C_3 | N_3 | service index |

TABLE 1-continued

| Element Code | Element Length | Description |
| --- | --- | --- |
| C_4 | N_4 | indication to service on operator's network |
| C_5 | N_5 | service class index |
| C_6 | N_6 | user or packet priority |
| . . . | . . . | . . . |

It is assumed that the SCI format message is formed as shown in Table 2.

TABLE 2

| C_2 | next indicator | C_5 | next indicator | C_4 | end indicator |
| --- | --- | --- | --- | --- | --- |

When a network entity receives an SCI format message described above, it may recognize that the SCI format message is composed of a field with a length N_2 for "indication to user roaming", a field with a length N_5 for "service class index", and a field with a length N_4 for "indication to service on operator's network". Later, the network entity may create or analyze an SCI according to this format.

Meanwhile, for sharing of SCI format information between nodes, alternative indicators or indexes may be utilized. Table 3 illustrates SCI format indexes and corresponding SCI formats.

TABLE 3

| SCI format index | SCI format |
| --- | --- |
| 1 | C_1 + C_3 + C_4 |
| 2 | C_5 |

That is, nodes utilizing SCIs may store and maintain a table or other data structure similar to Table 3. Table 3 contains SCI format indexes and associated SCI formats, wherein each SCI format is represented as a combination of element codes. One SCI format corresponds to a combination of element codes, whose lengths and descriptions may be identified by referring to Table 1. In Table 3, index 1 refers to an SCI format composed of the "PLMN ID" element of the marked node, the "service index" element, and the "indication to service on operator's network" element in sequence. Index 2 refers to an SCI format composed of the "service class index" element only. When a network entity receives an SCI format index as SCI format information, it may create or analyze an SCI by referring to Table 3 and Table 1.

Figure 7:
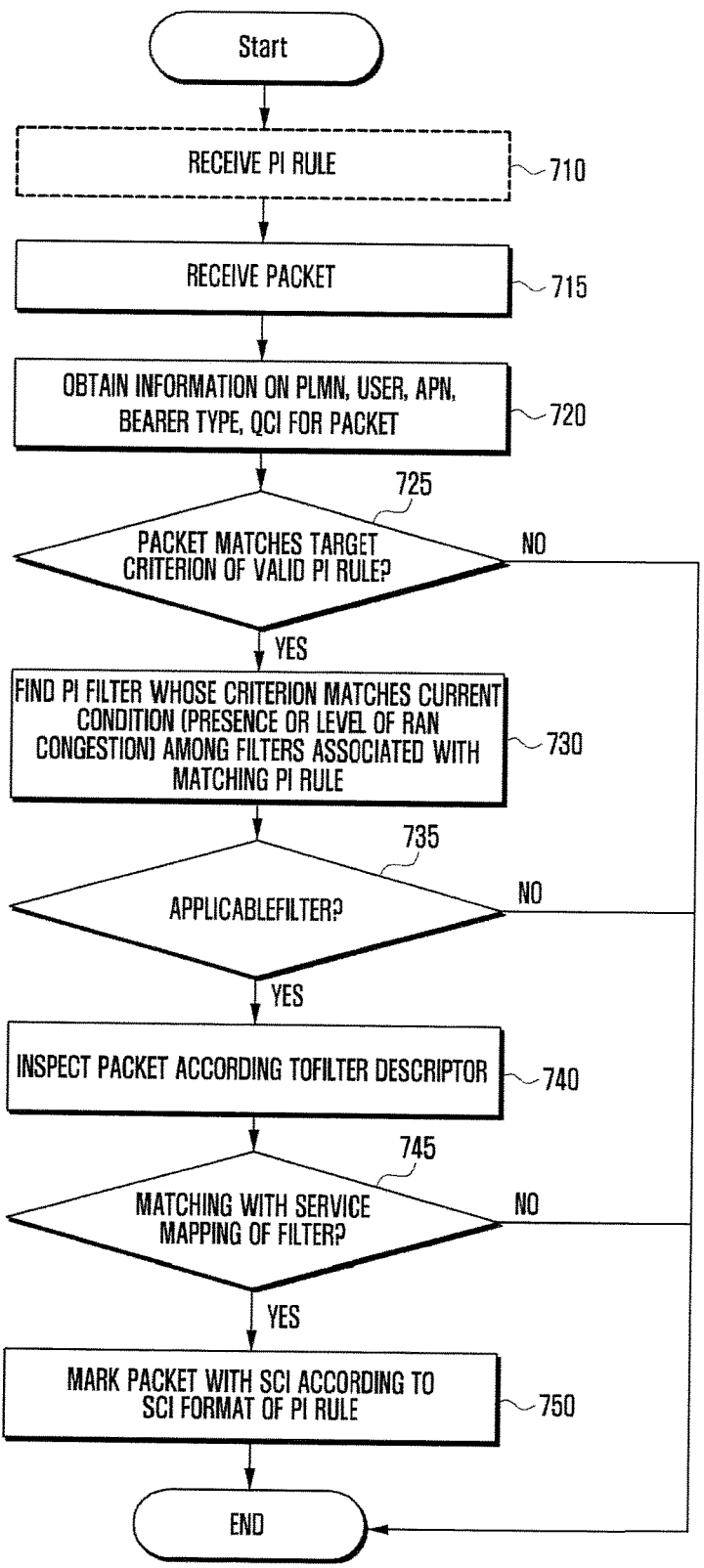
FIG. 7 is a flowchart of a procedure whereby the marker (gateway and/or TDF) performs SCI marking on user packets.

FIG. 7 is a flowchart of a procedure whereby the marker (gateway and/or TDF) performs SCI marking on user packets.

Referring to FIG. 7, at step 710, the marker 210 receives PI rules from the controller 200. Instead of receiving PI rules, the marker 210 may obtain PI rules in a different way. For example, the administrator may manually store PI rules in the marker 210. The marker 210 analyzes the received PI rules and applies the same later. Composition of the PI rule is described before in connection with FIGS. 2 to 6.

At step 715, the marker 210 receives a packet. At step 720, the marker 210 obtains information regarding at least one of PLMN ID (identifier of the Home PLMN to which the user of the packet belongs), user ID, APN, bearer type (GBR or non-GBR), and QCI in relation to the received packet. That is, the marker 210 collects information needed for matching with the target criterion of the PI rule.

At step 725, the marker 210 checks whether a valid PI rule whose target criterion matches the information collected at step 720 is present. If a valid PI rule whose target criterion matches the collected information is present, the procedure proceeds to step 730 at which the marker 210 finds a PI filter whose criterion matches the current condition among filters associated with the matching PI rule. At step 735, the marker 210 checks whether a PI filter whose criterion matches the current condition is present. If a PI filter whose criterion matches the current condition is present, the procedure proceeds to step 740.

A more detailed description is given of finding a PI filter applicable to the current condition. If the current condition is related to the level of congestion at the ENB corresponding with the UE, the marker 210 may select a PI filter whose criterion is related with a congestion level as an applicable filter.

In particular, the marker 210 may perform packet inspection in various ways. Schemes used for packet inspection may differ in terms of accuracy, processing time, and load, and may be adjusted according to the level of congestion at the ENB (RAN node) for optimal performance. For example, when the level of congestion at the ENB is low, only the IP addresses and next header field (type of higher layer protocol such as TCP or UDP) in the IP header may be inspected to reduce workload placed on the marker 210. This is because there is no problem even if the ENB processes all packets in a normal way. On the other hand, when the level of congestion at the ENB is high, deep packet inspection (DPI) may be performed to identify packet contents. In this case, as the ENB cannot process all packets in a normal way, it is necessary for the marker 210 to extract more detailed traffic and/or service information.

Each PI rule may contain a combination of ENB congestion indicators and filter descriptors (i.e. inspection depth and target) associated with various conditions. The marker 210 may select a suitable filter according to the situation of the ENB to which a packet is to be delivered. If a PI filter whose criterion matches the current condition of the ENB is present, at step 740, the marker 210 inspects the packet based on the corresponding filter descriptor. At step 745, the marker 210 checks whether an SCI value matching the inspection result is present. If an SCI value matching the inspection result is present, at step 750, the marker 210 marks the packet with the SCI value according to the SCI format of the PI rule and sends the marked packet to the ENB. SCI marking may be applied to, for example, the SCI field of the GPRS Tunneling Protocol—User Plane (GTP-U) header of the packet.

In one embodiment, the TDF may perform steps 710 to 750.

In another embodiment, the TDF may perform steps 710 to 745, and the P-GW may perform step 750. If an SCI value matching the result of inspection at step 740 is present, the marker 210 sends an SCI to be marked on the packet to the P-GW, which then may mark the packet with the SCI according to the SCI format of the PI rule.

As an embodiment, the marker 210 may be a network entity or physical apparatus capable of providing functions of both the TDF and the P-GW. For example, the P-GW 130 of FIG. 130 may serve as the marker 210.

As another embodiment, the marker 210 may include a TDF unit and the P-GW. The TDF unit may be a module performing TDF on the network as an entity physically separated from the P-GW. At step 750, the SCI to be marked on the packet may be sent from the TDF unit directly or via the PCRF 135 to the P-GW.

Next, a description is given of a scheme wherein the ENB (RAN node) receives a service control rule and operates according to the service control rule. For example, the controller may direct the ENB to perform, when a packet having a given SCI arrives, a specific operation such as gating (pass or discard) or scheduling priority adjustment on the packet. This enables finer packet control according to the SCI among packets belonging to a particular bearer with the same QoS requirements (QCI, GBR, MBR and the like).

Figure 8:
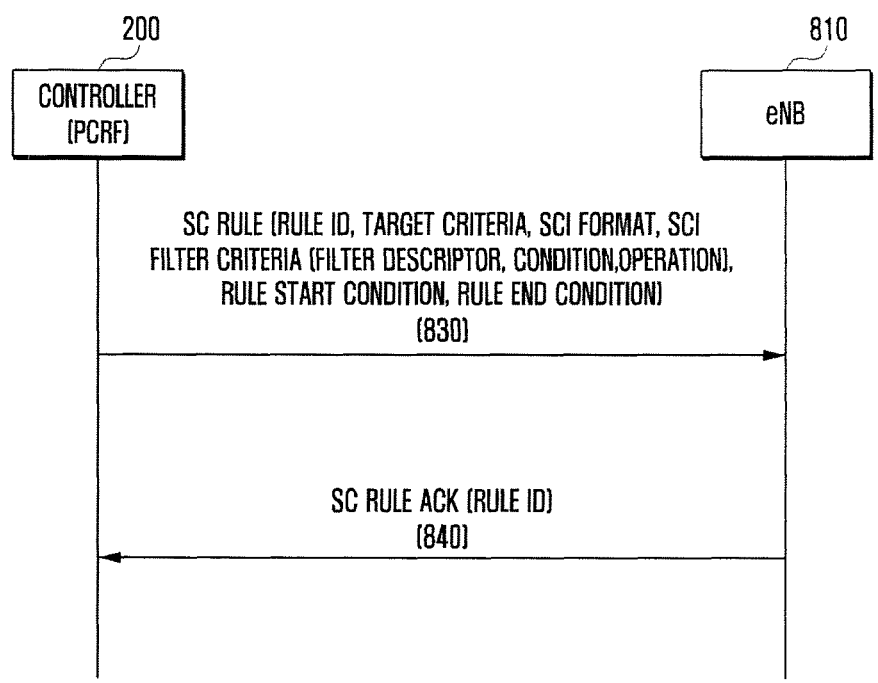
FIG. 8 is a sequence diagram of a procedure for transmitting an SC rule message according to an embodiment of the present invention.

FIG. 8 is a sequence diagram of a procedure for transmitting an SC rule message according to an embodiment of the present invention.

Referring to FIG. 8, at step 830, the controller 200 sends one or more service control (SC) rules to the ENB 810. An SC rule is composed of a rule ID, target criteria, SCI format, SCI filter descriptor, filter application condition, ENB operation to be performed for a packet matching the filter application condition, rule start condition, and rule end condition.

The target criteria may be given by PLMN ID, user or group ID, bearer type (GBR or non-GBR), QoS Class Identifier (QCI), or a combination thereof.

The SCI format indicates the format of supplementary information to be inserted in the packet header. The SCI format is described before with reference to FIGS. 2 to 6.

The SCI filter descriptor is given by conditional information regarding the whole or part of the SCI, and is an indication to whether the SC rule is applicable to the SCI of the packet. For example, the SCI filter descriptor may be given by a condition for the whole SCI having a specific value (SCI=XX) or a condition for an element of the SCI having a specific value (C_1=YY).

The filter application condition indicates a condition when the corresponding SCI filter descriptor is effective. For example, the filter application condition may correspond to whether the level of congestion is higher than or equal to a threshold level. The ENB operation indicates an operation of the ENB to be performed for a packet when the SCI of the packet matching the SCI filter descriptor.

Here, the SCI filter descriptor, filter application condition, and ENB operation are collectively referred to as SCI filter criteria.

The rule start condition is a condition used to determine validity of the rule, and may include time information. The rule end condition is a condition used to determine invalidity of the rule, and may include time information.

Upon successful reception of the SC rule, at step 840, the ENB 810 sends an SC rule ACK to the controller 200. The SC rule ACK contains the rule ID of the SC rule received at step 830. Hence, the controller 200 may be aware that the SC rule is successfully received by the ENB 810. The SC rule at step 830 and the SC rule ACK at step 840 are in correspondence.

Figure 9:
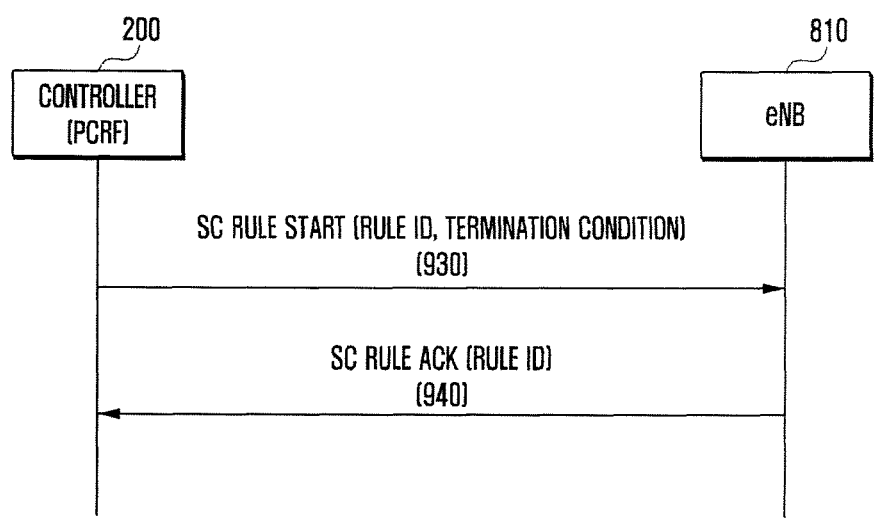
FIG. 9 is a sequence diagram of a procedure for transmitting an SC rule start message according to an embodiment of the present invention.

FIG. 9 is a sequence diagram of a procedure for transmitting an SC rule start message according to an embodiment of the present invention.

Referring to FIG. 9, at step 930, the controller 200 sends an SC rule start message indicating SC rule application to the ENB 810. Here, the SC rule start message may contain the rule ID of an SC rule to be applied and a termination condition for terminating application of the SC rule. Upon reception of an SC rule start message, the ENB 810 starts to apply the corresponding SC rule, which is treated as valid until the termination condition is satisfied.

Upon successful reception of the SC rule start message, at step 940, the ENB 810 sends an SC rule ACK indicating successful reception to the controller 200. The SC rule ACK contains the rule ID of the SC rule start message received at step 930. Hence, the controller 200 may be aware that the SC rule start message is successfully received by the ENB 810.

Figure 10:
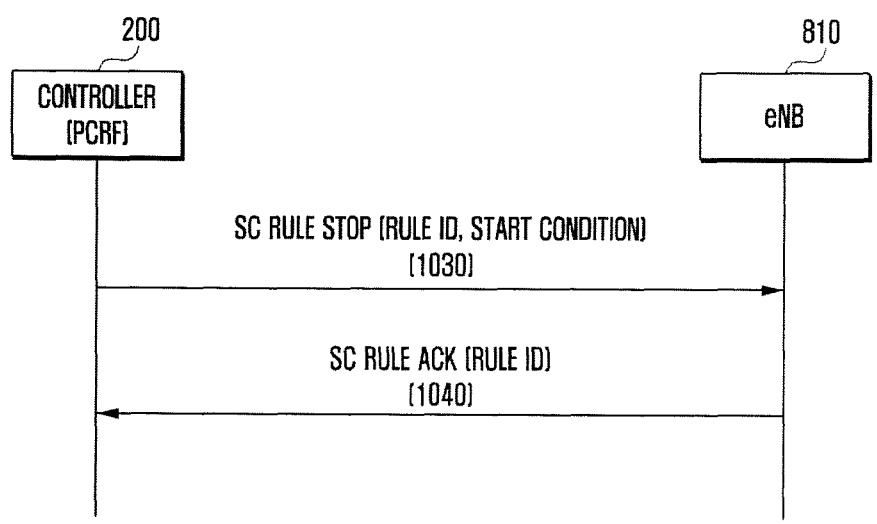
FIG. 10 is a sequence diagram of a procedure for transmitting an SC rule stop message according to an embodiment of the present invention.

FIG. 10 is a sequence diagram of a procedure for transmitting an SC rule stop message according to an embodiment of the present invention.

Referring to FIG. 10, at step 1030, the controller 200 sends an SC rule stop message indicating SC rule termination to the ENB 810. Here, the SC rule stop message may contain the rule ID of an SC rule to be stopped and a start condition for starting application of the SC rule. Upon reception of an SC rule stop message, the ENB 810 stops application of the corresponding SC rule, which is treated as invalid until the start condition is satisfied.

Upon successful reception of the SC rule stop message, at step 1040, the ENB 810 sends an SC rule ACK indicating successful reception to the controller 200. The SC rule ACK contains the rule ID of the SC rule stop message received at step 1030. Hence, the controller 200 may be aware that the SC rule stop message is successfully received by the ENB 810.

In FIGS. 8 to 10, an SC rule ACK message is utilized. To enable the controller 200 to readily identify the message corresponding to the ACK message, the ENB 810 may send the SC rule ACK message containing message identification information to the controller 200. Here, the message identification information may indicate one of an SC rule message, SC rule start message, and SC rule stop message. Alternatively, the controller 200 may send a message having a sequence number. Upon reception of the message, the ENB 810 may respond with an ACK message containing the sequence number.

The SC rule may be transmitted between the controller 200 and the ENB 810 without relation to a GTP session. The SC rule may also be transmitted with relation to a GTP session. When an SC rule is delivered without relation to a GTP session, the SC rule is applicable to all packets arriving at the ENB 810.

When an SC rule is delivered with relation to a GTP session, the SC rule is applicable only to packets belonging to the GTP session (i.e. corresponding bearers).

Figure 11:
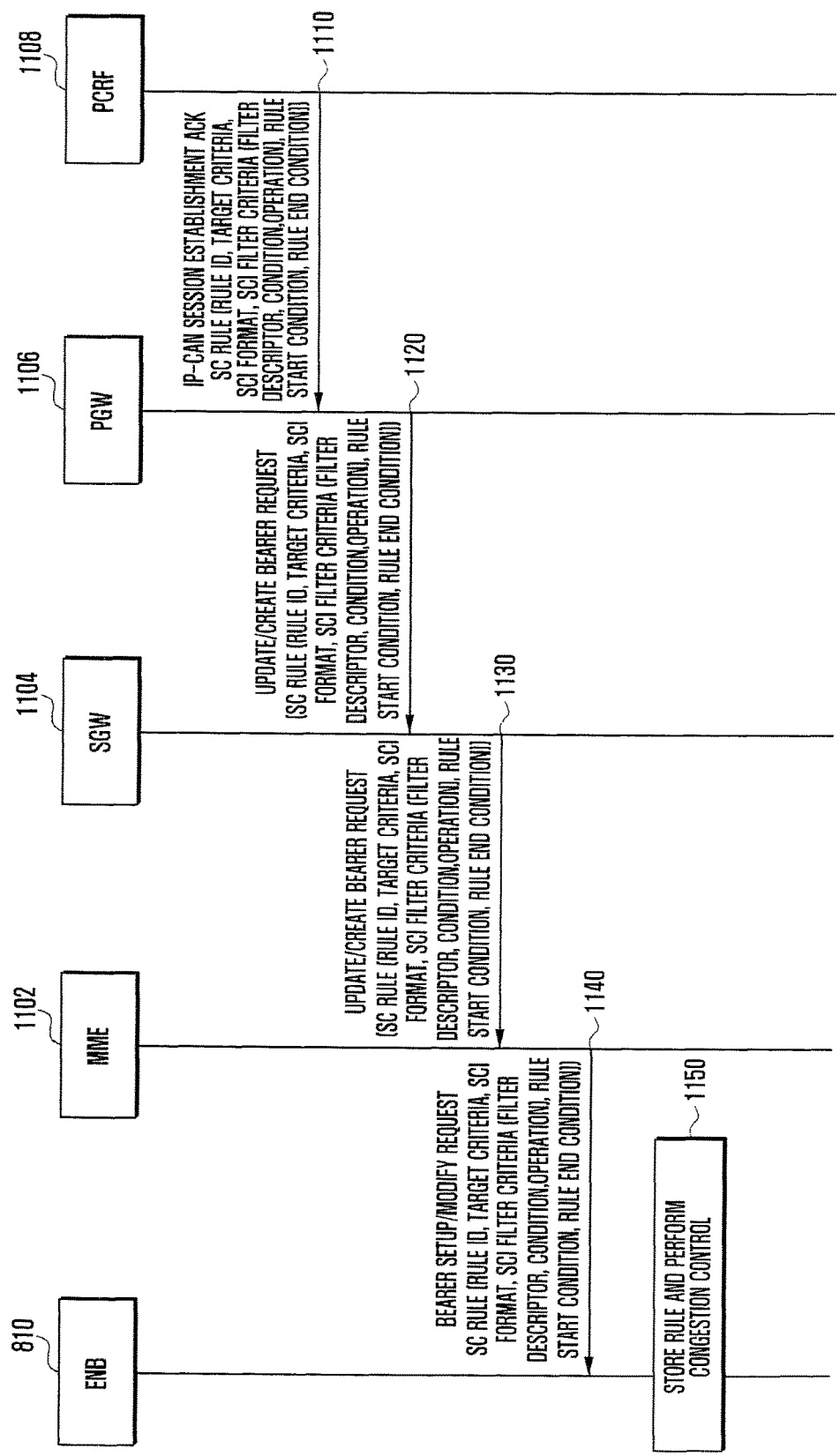
FIG. 11 is a sequence diagram of a procedure for SC rule transmission according to an embodiment of the present invention.

FIG. 11 is a sequence diagram of a procedure for SC rule transmission according to an embodiment of the present invention. In FIG. 11, an SC rule is delivered with relation to a GTP session.

In FIG. 11, the PCRF 1108 is described as serving as the controller 200, and the S-GW 1104 and/or the P-GW 1106 may act as the marker 210.

Referring to FIG. 11, at step 1110, the controller 200 sends IP-CAN Session Establishment Acknowledgement containing an SC rule to the P-GW 1106. The SC rule may also be sent together with IP-CAN Session Establishment Acknowledgement.

When ENB operations for the SC rule are different from PDN connection to PDN connection, at step 1120, the P-GW 1106 sends Create Session Response or Update/Create Bearer Request containing SC rule information related only to the corresponding PDN connection to the S-GW 1104. At step 1130, the S-GW 1104 sends Create Session Response or Update/Create Bearer Request containing the SC rule information to the MME 1102.

At step 1140, the MME 1102 sends Initial Context Setup Request or Bearer Setup Request containing the SC rule information to the ENB 810. When the SC rule is applied only to selected bearers, the target criteria may include a bearer ID list. In this case, the SC rule is applied only to bearers on the bearer ID list.

When SC rule control is separately performed for individual bearers, for each bearer included in the SC rule received from the controller 200, the P-GW 1106 sends Update Bearer Request or Create Bearer Request containing SC rule information to the S-GW 1104. In this case, as the SC rule information is sent for a specific bearer, the target criteria (bearer ID list) may be omitted. Hence, the SC rule information may be composed of the remaining fields for rule ID, SCI format, SCI filter criteria, rule start condition, and rule end condition. The S-GW 1104 sends Update Bearer Request or Create Bearer Request containing the received SC rule information to the MME 1102. The MME 1102 sends Bearer Setup Request or Bearer Modify Request containing the received SC rule information to the ENB 810.

Figure 12:
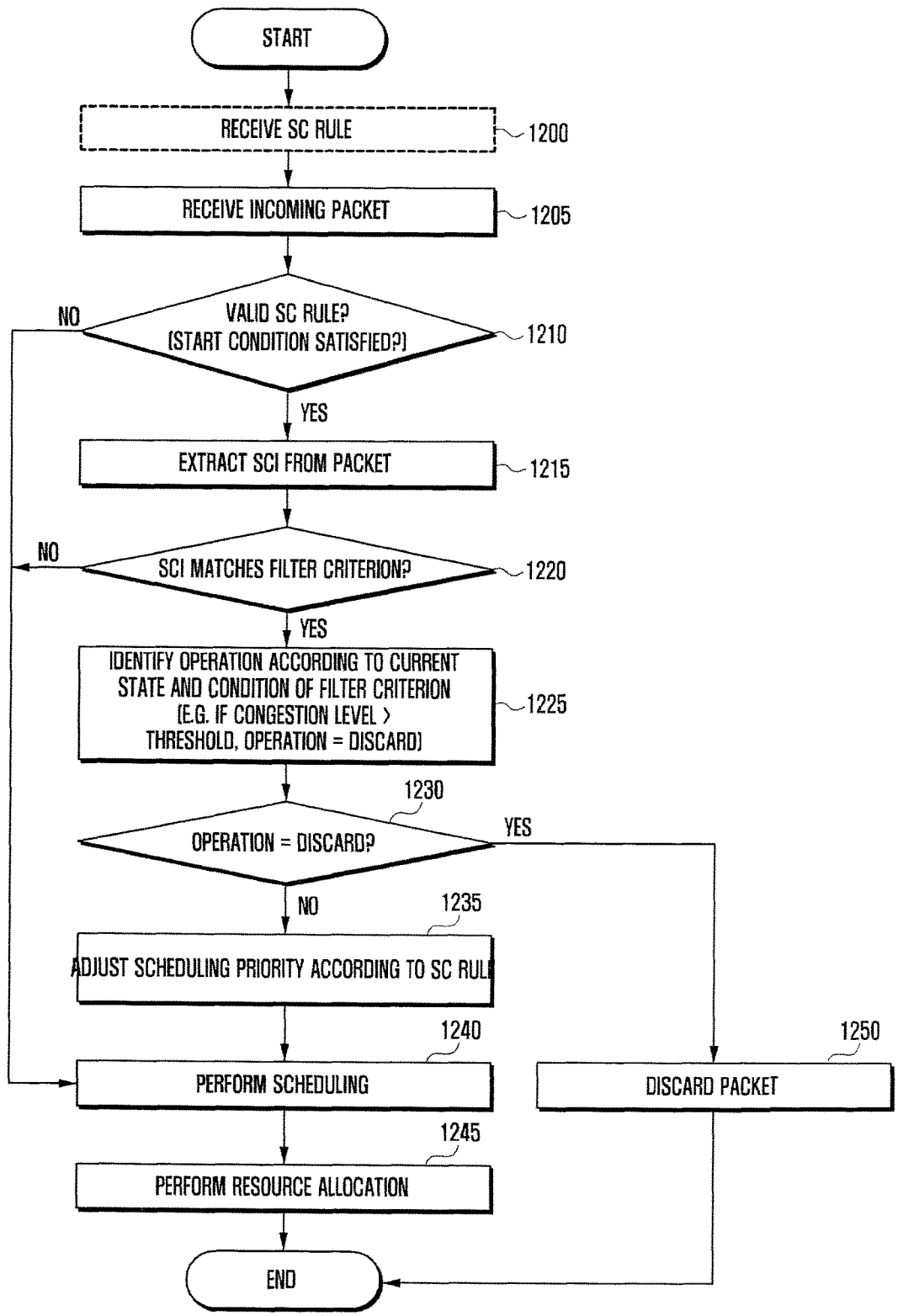
FIG. 12 is a flowchart of a procedure for the ENB to process packets according to an embodiment of the present invention.

FIG. 12 is a flowchart of a procedure for the ENB to process packets according to an embodiment of the present invention.

Referring to FIG. 12, at step 1200, the ENB 810 receives SC rules directly or via the core network from the controller 200. Instead of receiving SC rules, the ENB 810 may obtain SC rules in a different way. For example, the administrator may manually store SC rules in the ENB 810. The ENB 810 analyzes the received SC rules and applies the same later. Composition of the SC rule is described before in connection with FIG. 8.

At step 1205, the ENB 810 receives a packet. Thereafter, the ENB 810 may determine the scheme to deal with the received packet according to the obtained SC rules. At step 1210, the ENB 810 checks presence of a valid SC rule. For example, if an SC rule whose start condition is satisfied is present, the ENB 810 may determine that a valid SC rule is present. If a valid SC rule is not present, the procedure proceeds to step 1240 at which the ENB 810 performs existing operations related to resource allocation for packet transmission. If a valid SC rule is present, at step 1215, the ENB 810 extracts an SCI from the packet with reference to SCI format information. The SCI may be included in, for example, the GTP-U header of the packet.

At step 1220, the ENB 810 checks whether the SCI matches the SCI filter criterion of the valid SC rule. If the SCI matches the SCI filter criterion of the valid SC rule, at step 1225, the ENB 810 checks whether the current network state matches a condition of the SCI filter criterion, and, if a match is found, performs an operation corresponding to the matched condition. For example, the ENB 810 may perform gating (discard or bypass) or adjustment of scheduling priority.

Table 4 illustrates SCI filter criteria for packet processing at the ENB 810.

TABLE 4

| SCI descriptor | Condition | Operation | Precedence order |
|---|---|---|---|
| SCI = XX | congestion | discard packet | 1 |
| | non-congestion | scheduling priority = 0 | 2 |
| C_3 = YY | congestion level > T1 | scheduling priority = 2 | 3 |
| | congestion level > T2 | scheduling priority = 3 | 4 |
| C_1 = WW and C_5 = ZZ | congestion | discard packet | 5 |

When two or more SCI descriptors and conditions are met, the ENB 810 applies the operation given by the precedence order. When the SCI of the packet is XX and the network is currently in a congested state, the ENB 810 performs the corresponding operation (i.e. discards the packet). When the SCI of the packet is XX and the network is currently not in a congested state, the ENB 810 sets the scheduling priority of the packet to 0.

When the element C_3 of the SCI extracted from the packet is YY and the congestion level is higher than T1, the ENB 810 sets the scheduling priority of the packet to 2. When the element C_3 of the SCI is YY and the congestion level is higher than T2 and lower than T1, the ENB 810 sets the scheduling priority of the packet to 3.

When the element C_1 of the SCI extracted from the packet is WW and the element C_5 is ZZ, the ENB 810 checks the network state and discards the packet if the network is in a congested state.

In the present embodiment, the ENB 810 determines the operation on the basis of the SCI of the packet and the level of congestion. However, the SCI is only an example of information added to the packet. The marker 210 may add supplementary information other than SCI to the packet so as to facilitate packet processing of the ENB 810. In this case, the SCI filter descriptor may be replaced with another descriptor indicating a condition to be matched with the supplementary information for filtering. In addition, the ENB 810 may determine the operation on the basis of current or past state information other than the congestion state.

As a variant example, the ENB 810 may determine the operation on the basis of SCI or other supplementary information of the packet header only regardless of the congestion state. In this case, the SCI filter criteria of FIG. 8 may be composed of fields only for SCI filter descriptor (supplementary information descriptor) and associated operation. As another variant example, the SCI filter criteria may be described using operations associated with congestion levels or states, such as "discard packet in case of congestion", with the "condition" field omitted.

Referring back to FIG. 12, at step 1230, the ENB 810 checks whether the determined operation indicates packet discard. If the determined operation indicates packet discard, the procedure proceeds to step 1250 at which the ENB 810 discards the packet. If the determined operation indicates adjustment of scheduling priority (not packet discard), the procedure proceeds to step 1235 at which the ENB 810 adjusts the scheduling priority of the packet according to the SC rule. If a different operation other than packet discard or scheduling priority adjustment is indicated, the ENB 810 may perform the operation as indicated.

At step 1240, the ENB 810 performs scheduling for the packet. At step 1245, the ENB 810 performs resource allocation for the packet.

With scheduling priority adjustment based on the SCI, it is possible to apply differentiated scheduling to packets belonging to an identical EPS bearer with the same QCI, enabling more elaborate control in comparison to conventional resource allocation based on the QCI.

Figure 16:
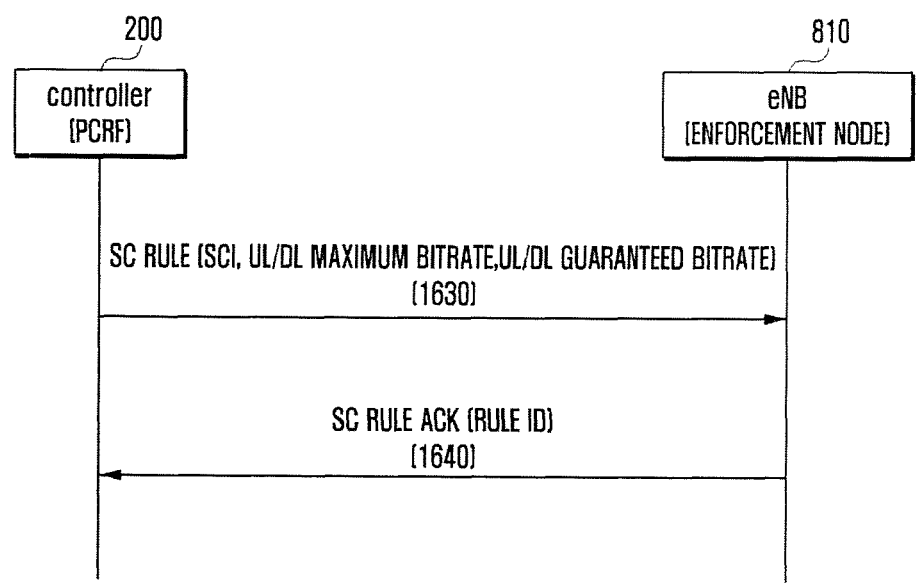
FIG. 16 is a sequence diagram of a procedure for transmitting an SC rule message according to another embodiment of the present invention.
Figure 17:
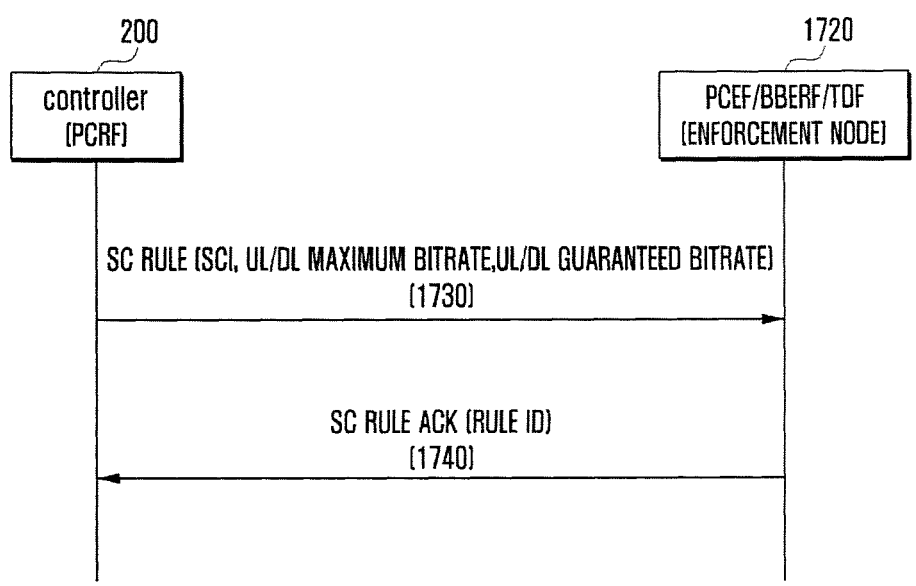
FIG. 17 is a sequence diagram of a procedure for transmitting an SC rule message according to another embodiment of the present invention.
Figure 18:
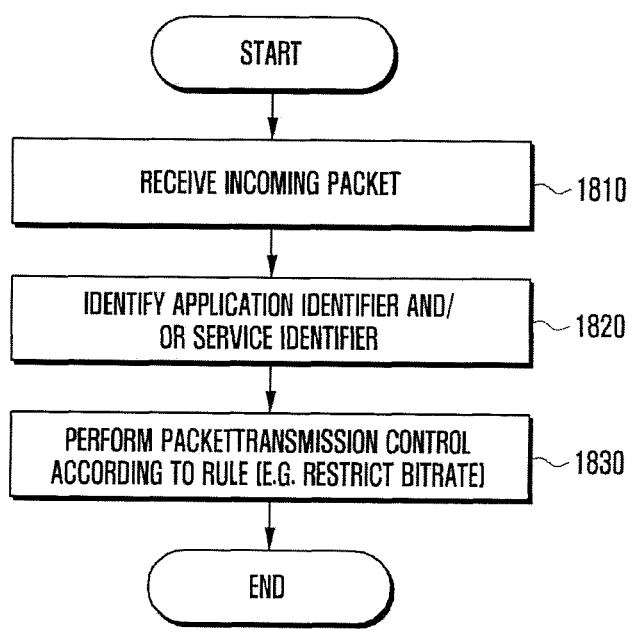
FIG. 18 is a flowchart of a procedure for an enforcement node to process packets according to the embodiment of FIG. 16 or FIG. 17.

Next, another embodiment of the present invention is described with reference to FIGS. 16 to 18. The present embodiment relates to a scheme for separately controlling bitrates on an application and/or service basis. In the embodiment of FIGS. 16 to 18, an enforcement node such as a RAN node, Policy and Charging Enforcement Function (PCEF), and TDF may receive a packet. When the packet is determined as belonging to a given application and/or service, the enforcement node may perform transmission control on the basis of the maximum bitrate and/or the guaranteed bitrate preset for the application and/or service. When a maximum bitrate in the downlink (uplink) is preset for an application and/or service, the enforcement node may perform resource allocation and transmission so that the bitrate of downlink (uplink) traffic associated with the application and/or service does not exceed the maximum bitrate. Similarly, when a guaranteed bitrate in the downlink (uplink) is preset for an application and/or service, the enforcement node may perform resource allocation and transmission so that the bitrate of downlink (uplink) traffic associated with the application and/or service is higher than or equal to the guaranteed bitrate.

FIG. 16 is a sequence diagram of a procedure for transmitting an SC rule message according to another embodiment of the present invention.

In FIG. 16, the controller 200 sends an enforcement node a rule having an SCI or application ID and associated control operation, and receives a corresponding response. Here, it is assumed that the controller 200 is the PCRF and the enforcement node is an ENB 810 (RAN node).

Referring to FIG. 16, at step 1630, the controller 200 sends an SC rule message to the ENB 810. The SC rule message includes an application or service identifier. The SC rule message further includes parameters that are used to perform transmission scheduling or resource allocation for packets having the above application or service identifier. The parameters may include an uplink/downlink maximum bitrate and uplink/downlink guaranteed bitrate.

In FIG. 16, the controller 200 is depicted as sending control rules and associated parameters to the ENB 810. However, according to network configurations, such control information may be delivered from the controller 200 to the ENB 810 via other network entities. For example, rules and associated parameters generated by the PCRF 200 may be sent through the P-GW, S-GW and MME in sequence to the RAN node 810.

FIG. 17 is a sequence diagram of a procedure for transmitting an SC rule message according to another embodiment of the present invention.

In FIG. 17, the controller 200 is the PCRF as in the case of FIG. 16. Unlike the embodiment of FIG. 16, the enforcement node may be one of the PCEF, Bearer Binding and Event Reporting Function (BBERF), and TDF as indicated by indicia 1720. In FIG. 16, the enforcement node 810 is a node that is connected with a UE and performs UE scheduling and accepts UE access, such as a RAN node or ENB. On the other hand, in FIG. 17, the enforcement node 1720 is indirectly coupled with an ENB or other entity instead of being directly connected with a UE like an ENB, and acts as a channel to transfer data packets from the outside of the network to the ENB for the downlink and acts as a channel to transfer data packets from the ENB to the outside of the network for the uplink.

At step 1730, the controller 200 sends an SC rule message to the enforcement node 1720. The SC rule message includes an application and/or service identifier and a control rule for the identifier. The SC rule message further includes parameters that are used to perform transmission scheduling or resource allocation for packets having the above application or service identifier. The parameters may include one or more of an uplink/downlink maximum bitrate and an uplink/downlink guaranteed bitrate. At step 1740, the controller 200 receives an ACK corresponding to the SC rule message from the enforcement node 1720.

Packet processing at the enforcement node 1720 such as the PCEF, BBERF or TDF is similar to that at the enforcement node 810 such as a RAN node in FIG. 16. However, packet transmission control of the enforcement node 1720 may be different from that of the enforcement node 810. For example, the enforcement node may discard a packet, lower transmission priority of a packet and store the same for a while, or forward a packet to another network entity so that the bitrate of traffic associated with a specific application and/or service does not exceed a preset maximum bitrate. On the other hand, in FIG. 16, as the enforcement node 810 directly performs scheduling, it may guarantee or limit the bitrate through scheduling.

FIG. 18 is a flowchart of a procedure for an enforcement node to process packets according to the embodiment of FIG. 16 or FIG. 17.

Referring to FIG. 18, at step 1810, the enforcement node 810 or 1720 receives an incoming packet. At step 1820, the enforcement node 810 or 1720 obtains an application and/or service identifier associated with the packet through packet analysis or the like. The application and/or service identifier may be one of an SCI and application ID.

At step 1830, the enforcement node 810 or 1720 performs transmission control or resource allocation according to a policy or rule set for the application and/or service identifier.

When the rule set for the application and/or service identifier associated with the packet is related to a maximum bitrate, transmission control or resource allocation is performed so that the bitrate of traffic associated with the corresponding application and/or service does not exceed the maximum bitrate. To limit the bitrate, the enforcement node 810 in FIG. 16 may delay or suspend scheduling for transmitting the packet. To limit the bitrate, the enforcement node 1720 in FIG. 17 may discard the packet, lower transmission priority of the packet and store the same for a while, or forward the packet to another network entity.

When the rule set for the application and/or service identifier associated with the packet is related to a guaranteed bitrate, transmission control or resource allocation is performed so that the bitrate of traffic associated with the corresponding application and/or service is higher than or equal to the guaranteed bitrate. To guarantee the bitrate, the enforcement node 810 in FIG. 16 may raise scheduling priority for transmitting the packet. To guarantee the bitrate, the enforcement node 1720 in FIG. 17 may raise transmission priority for the packet so that the packet is delivered faster than other packets.

The operation at step 1830 may be applied separately to transmission directions (uplink and downlink).

Figure 13:
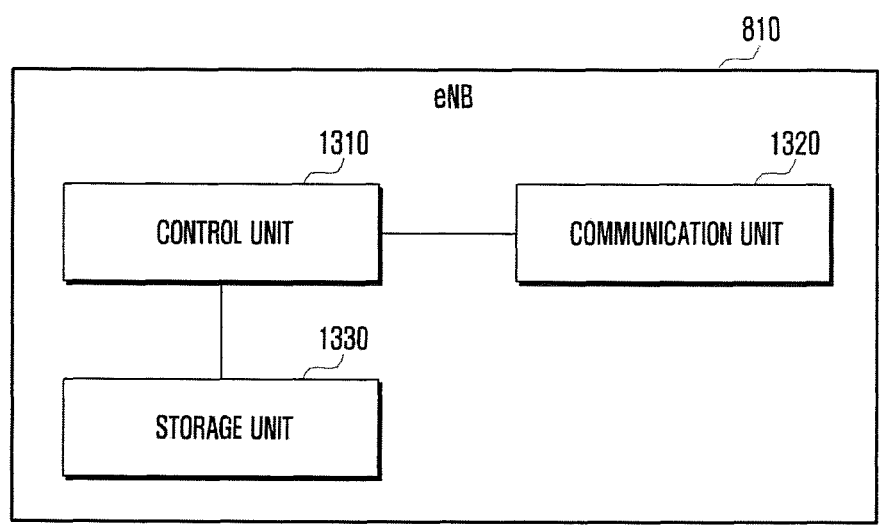
FIG. 13 is a block diagram of the ENB according to an embodiment of the present invention.

FIG. 13 is a block diagram of the ENB according to an embodiment of the present invention.

Referring to FIG. 13, the ENB 810 according to an embodiment of the present invention may include a control unit 1310, a communication unit 1320, and a storage unit 1330.

The communication unit 1320 communicates with a UE or other network entity under control of the control unit 1310. In particular, the communication unit 1320 may receive SC rule and related messages from the controller 200, and receive packets from other network entities. The control unit 1310 processes a received packet according to at least one of the embodiments described before. The control unit 1310 performs control necessary for normal operation of the ENB 810. For example, the control unit 1310 may perform scheduling or resource allocation. In addition, the control unit 1310 may discard a packet or adjust scheduling priority of a packet according to supplementary information such as SCI of the packet and SCI filter criteria. The storage unit 1330 may temporarily store received packets and store necessary data. The storage unit 1330 may store a received SC rule in a suitable form, and provide information regarding the SC rule in response to a request from the control unit 1310.

Figure 14:
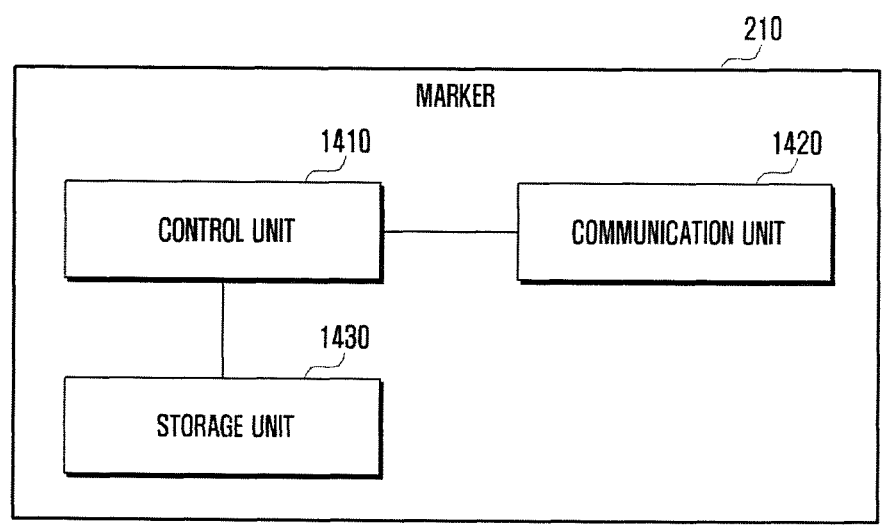
FIG. 14 is a block diagram of the marker according to an embodiment of the present invention.

FIG. 14 is a block diagram of the marker according to an embodiment of the present invention.

Referring to FIG. 14, the marker 210 according to an embodiment of the present invention may include a control unit 1410, a communication unit 1420, and a storage unit 1430.

The communication unit 1420 communicates with another network entity under control of the control unit 1410. In particular, the communication unit 1420 may receive PI rule and related messages from the controller 200, and receive packets from other network entities. The control unit 1410 processes a received packet according to at least one of the embodiments described before. The communication unit 1420 may send packets processed by the control unit 1410 to the ENB 810 or other network entity. The control unit 1410 performs control necessary for normal operation of the marker 210. The control unit 1410 may act as the TDF or P-GW. The control unit 1410 may mark the packet header with an SCI (supplementary information) according to the PI filter criteria. The storage unit 1430 may temporarily store received packets and store necessary data. The storage unit 1430 may store a received PI rule in a suitable form, and provide information regarding the PI rule in response to a request from the control unit 1410.

The enforcement node 1720 shown in FIG. 17 and the marker 210 shown in FIG. 14 may have a similar configuration. In this case, the enforcement node 1720 may serve as the marker 210 and, in addition, receive an SC rule message and process a packet accordingly. Alternatively, the enforcement node 1720 may receive an SC rule message and process a packet accordingly without serving as the marker 210.

Figure 15:
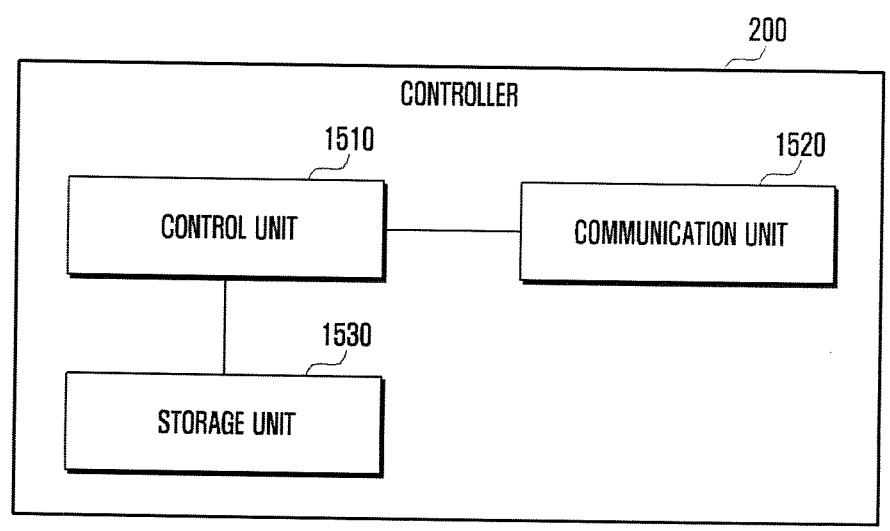
FIG. 15 is a block diagram of the controller according to an embodiment of the present invention.

FIG. 15 is a block diagram of the controller according to an embodiment of the present invention.

Referring to FIG. 15, the controller 200 according to an embodiment of the present invention may include a control unit 1510, a communication unit 1520, and a storage unit 1530.

The communication unit 1520 communicates with other network entities under control of the control unit 1510. In particular, the communication unit 1520 may send an SC rule message, SC rule start message, and SC rule stop message to the ENB 810. The communication unit 1520 may send a PI rule message, PI rule start message, and PI rule stop message to the marker 210. The control unit 1510 may generate a PI rule and/or SC rule according to at least one of the embodiments described before. The control unit 1510 performs control necessary for normal operation of the controller 200. The storage unit 1530 may temporarily store received packets and store necessary data. The storage unit 1530 may store a generated SC rule and/or PI rule in a suitable form, and provide information regarding the SC rule and/or PI rule in response to a request from the control unit 1510.

The controller 200, marker 210 and ENB 810 shown in FIGS. 13 to 15 may be configured to carry out some of the embodiments described with reference to FIGS. 2 to 12 and FIGS. 16 to 18, or to carry out a combination thereof.

Meanwhile, it is known to those skilled in the art that blocks of a flowchart and a combination of flowcharts may be represented and executed by computer program instructions. These computer program instructions may be loaded on a processor of a general purpose computer, a special computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

INDUSTRIAL APPLICABILITY

The above description is provided to assist in a comprehensive understanding of various embodiments of the present invention. It includes various specific details to assist in that understanding but these are to be regarded as merely exemplary. Accordingly, those of ordinary skill in the art will recognize that various changes and modifications of the embodiments described herein can be made without departing from the scope and spirit of the present invention.

Exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method for operating a base station in a wireless communication system, the method comprising:
receiving packets including priority information for a single user equipment (UE) from a packet data network gateway (P-GW) with public land mobile network (PLMN) information associated with an entity that assigned the priority information, the packets for the single UE being mapped to a same quality of service (QoS) class identifier (QCI);
identifying whether to use the priority information for identifying a priority of the packets based on the PLMN information and whether a type of a bearer for the packets is a non-guaranteed bit rate (non-GBR) bearer;
identifying the priority of the packets mapped to the same QCI based on the priority information in case that a configuration for the priority information is enabled in the base station and in case that a radio access network (RAN) congestion situation occurs; and
scheduling the packets mapped to the same QCI differently based on the identified priority of the packets,
wherein the priority information is determined by performing a packet inspection based on at least one of an internet protocol (IP) address or a type of a higher layer protocol in case that the RAN congestion situation does not occur, and
wherein the priority information is determined by performing the packet inspection based on a deep packet inspection in case that the RAN congestion situation occurs.

2. The method of claim 1, wherein the scheduling comprises applying the priority information for different treatment of the packets during the RAN congestion situation, and wherein in case that the configuration for the priority information is not enabled in the base station, the priority information is ignored.

3. The method of claim 1, wherein the priority information is marked on a general packet radio service (GPRS) tunneling protocol (GTP) based interface of the packets.

4. The method of claim 3, wherein the packets are downlink user plane packets, and wherein the packets further comprise information related to a roaming.

5. The method of claim 1, further comprising configuring information including parameters that describe packet treatment in the RAN congestion situation according to the priority information.

6. The method of claim 1, wherein the priority information comprises parameters that describe a relative priority of the packets.

7. A base station in a wireless communication system, the base station comprising:
a transceiver; and
a controller coupled with the transceiver and configured to:
receive, via the transceiver, packets including priority information for a single user equipment (UE) from a packet data network gateway (P-GW) with public land mobile network (PLMN) information associated with an entity that assigned the priority information, the packets for the single UE being mapped to a same quality of service (QoS) class identifier (QCI),
identify whether to use the priority information for identifying a priority of the packets, based on the PLMN information and whether a type of a bearer for the packets is a non-guaranteed bit rate (non-GBR) bearer,
identify a priority of the packets mapped to the same QCI based on the priority information in case that a configuration for the priority information is enabled in the base station and in case that a radio access network (RAN) congestion situation occurs, and
schedule the packets mapped to the same QCI differently based on the identified priority of the packets, wherein the priority information is determined by performing a packet inspection based on at least one of an internet protocol (IP) address or a type of a higher layer protocol in case that the RAN congestion situation does not occur, and wherein the priority information is determined by performing the packet inspection based on a deep packet inspection in case that the RAN congestion situation occurs.

8. The base station of claim 7, wherein the controller is further configured to apply the priority information for different treatment of the packets during the RAN congestion situation, and wherein in case that the configuration for the priority information is not enabled in the base station, the priority information is ignored.

9. The base station of claim 7, wherein the priority information is marked on a general packet radio service (GPRS) tunneling protocol (GTP) based interface of the packets.

10. The base station of claim 9, wherein the packets are downlink user plane packets, and wherein the packets further comprise information related to a roaming.

11. The base station of claim 7, wherein the controller is further configured to configure information including parameters that describe packet treatment in the RAN congestion situation according to the priority information.

12. The base station of claim 7, wherein the priority information comprises parameters that describe a relative priority of the packets.

13. A method by a packet data network gateway (P-GW) in a wireless communication network, the method comprising:

receiving information on an operator's policy;

receiving packets for a single user equipment (UE), the packets for the single UE being mapped to a same quality of service (QoS) class identifier (QCI);

inspecting information included in the packets;

marking the packets with priority information based on the inspected information and the information on the operator's policy; and transmitting the packets marked with the priority information to a base station, wherein the priority information is transmitted with public land mobile network (PLMN) information associated with an entity that assigned the priority information, wherein whether to use the priority information is identified for identifying a priority of the packets, based on the PLMN information and whether a type of a bearer for the packets is a non-guaranteed bit rate (non-GBR) bearer, wherein the packets having the same QCI are scheduled differently based on the priority information in case that a configuration for the priority information is enabled in the base station and in case that a radio access network (RAN) congestion situation occurs, wherein the priority information is determined by performing a packet inspection based on at least one of an internet protocol (IP) address or a type of a higher layer protocol in case that the RAN congestion situation does not occur, and wherein the priority information is determined by performing the packet inspection based on a deep packet inspection in case that the RAN congestion situation occurs.

14. The method of claim 13, wherein the priority information is used for scheduling of the packets by the base station, and wherein in case that the configuration for the priority information is not enabled in the base station, the priority information is ignored.

15. The method of claim 13, wherein the priority information is applied for different treatment of the packets during the RAN congestion situation.

16. The method of claim 13, wherein the priority information is marked on a general packet radio service (GPRS) tunneling protocol (GTP) based interface of the packets.

17. The method of claim 16, wherein the packets are downlink user plane packets, and wherein the packets further comprise information related to a roaming.

18. The method of claim 13, wherein the priority information comprises parameters that describe a relative priority of the packets.

19. A packet data network gateway (P-GW) in a wireless communication network, the P-GW comprising:

a transceiver; and a controller coupled with the transceiver and configured to:

receive, via the transceiver, information on an operator's policy, receive, via the transceiver, packets for a single user equipment (UE), the packets for the single UE being mapped to a same quality of service (QoS) class identifier (QCI), inspect information included in the packets, mark the packets with priority information based on the inspected information and the information on the operator's policy, and transmit, via the transceiver, the packets marked with the priority information to a base station, wherein the priority information is transmitted with public land mobile network (PLMN) information associated with an entity that assigned the priority information, wherein whether to use the priority information is identified for identifying a priority of the packets, based on the PLMN information and whether a type of a bearer for the packets is a non-guaranteed bit rate (non-GBR) bearer, wherein the packets having the same QCI are scheduled differently based on the priority information in case that a configuration for the priority information is enabled in the base station and in case that a radio access network (RAN) congestion situation occurs, wherein the priority information is determined by performing a packet inspection based on at least one of an internet protocol (IP) address or a type of a higher layer protocol in case that the RAN congestion situation does not occur, and wherein the priority information is determined by performing the packet inspection based on a deep packet inspection in case that the RAN congestion situation occurs.

20. The P-GW of claim 19, wherein the priority information is used for scheduling of the packets by the base station, and wherein in case that the configuration for the priority information is not enabled in the base station, the priority information is ignored.

21. The P-GW of claim 19, wherein the priority information is applied for different treatment of the packets during the RAN congestion situation.

22. The P-GW of claim 19, wherein the priority information is marked on a general packet radio service (GPRS) tunneling protocol (GTP) based interface of the packets.

23. The P-GW of claim 22, wherein the packets are downlink user plane packets, and wherein the packets further comprise information related to a roaming.

24. The P-GW of claim 19, wherein the priority information comprises parameters that describe a relative priority of the packets.

* * * * *